(12) United States Patent
Mun

(10) Patent No.: US 8,422,472 B2
(45) Date of Patent: Apr. 16, 2013

(54) METHOD AND SYSTEM FOR OPERATING CELLS IN AN OVERLAY NETWORK INCLUDING MACRO CELLS AND HOME CELLS

(75) Inventor: Seung-Cheol Mun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 12/940,290

(22) Filed: Nov. 5, 2010

(65) Prior Publication Data

US 2011/0110347 A1    May 12, 2011

(30) Foreign Application Priority Data

Nov. 6, 2009  (KR) .................. 10-2009-0106947

(51) Int. Cl.
*H04W 4/00*  (2009.01)
(52) U.S. Cl.
USPC .......................................... 370/338; 370/328
(58) Field of Classification Search .................. 370/328, 370/338
See application file for complete search history.

(56) References Cited

U.S. PATENT DOCUMENTS 8,085,684 B2 * 12/2011 Kwon et al. ................... 370/252
2009/0132675 A1 * 5/2009 Horn et al. ..................... 709/207
2010/0099424 A1 * 4/2010 Centonza ....................... 455/450

* cited by examiner

*Primary Examiner* — Kenny Lin
(74) *Attorney, Agent, or Firm* — Jefferson IP Law, LLP

(57) ABSTRACT

A method and system for operating cells in a network where macro cells and home cells coexist are provided. The method includes determining a first set of neighbor macro Base Stations (BSs) located within a predefined reference distance from a new macro BS to be newly installed, determining a second set of neighbor macro BSs having a cell region overlapping a region of a serving cell served by the new macro BS, detecting at least one sector including a contact with the cell region of the new macro BS within a cell region of each of the neighbor macro BSs in the second set, determining a neighbor cell set including the detected at least one sector, generating an initial Neighbor Relation Table (NRT) by mapping information about each of neighbor cells included in the neighbor cell set, IDentifiers (IDs) of neighbor macro BSs serving the neighbor cells, and a Physical Resource Cell IDentifier (PCID) allocated to each of the neighbor macro BSs, and providing the initial NRT to the new macro BS as neighbor BS information.

12 Claims, 7 Drawing Sheets

METHOD AND SYSTEM FOR OPERATING CELLS IN AN OVERLAY NETWORK INCLUDING MACRO CELLS AND HOME CELLS

PRIORITY

This application claims the benefit under 35 U.S.C. §119 (a) of a Korean patent application filed in the Korean Intellectual Property Office on Nov. 6, 2009 and assigned Serial No. 10-2009-0106947, the entire disclosure of which is hereby incorporated by reference.

BACKGROUND OF THE INVENTION

1. Field of the Invention

The present invention relates to a method and system for operating cells in an overlay network where macro cells and home cells coexist.

2. Description of the Related Art

With the development of communication technology and the increasing deployment of multimedia technology, a variety of mass transfer technologies have been applied to mobile communication systems, and one of their key issues is an increase in wireless capacity. The increase in wireless capacity may be achieved in various ways. For example, more frequencies may be allocated to increase the wireless capacity, but this is impracticable because of the finiteness of the frequency resources. Therefore, a method of more efficiently using the limited frequency resources is required, and for the efficient use of the limited frequency resources, a method of increasing the frequency utilization efficiency and a method of miniaturizing service cells may be considered. In particular, the cell miniaturizing method can provide a plurality of User Equipments (UEs) with the wireless environment where abundant higher-quality resources are available, thereby enabling high-capacity services.

Unlike the conventional Base Station (BS) or Node B (hereinafter referred to as a 'macro BS'), a BS, which provides communication services to a small number of UEs existing in a home cell region or a micro communication region such as an independent office, a residence and a building, is defined as a home Node B or a home BS. A plurality of home BSs serving an arbitrary home cell region exist in a macro cell region served by the macro BS. The home cell may connect a mobile phone to the Internet, providing Fixed Mobile Convergence (FMC) services or combined wire/wireless services at low cost.

In the conventional communication system, if powered on by a user, the home BS operates in a receive mode like the UE, instead of transmitting data in a downlink time period, and measures signal strengths of neighbor BSs. Based on the collected information, the home BS determines the neighbor BSs depending on Frequency Assignment (FA), transmit power, and BS information. The neighbor BSs are used to make a list of candidate BSs subjected to handover attempt. The list of neighbor BSs may be set in a manual manner proposed by a mobile network operator, or may be automatically set based on signal measurement.

While the macro BS is installed by the mobile network operator, the home BS is installed or uninstalled by the user, making it difficult for the macro BS to manually update each home BS in its neighbor BS list.

Typically, once installed, a new macro BS generates installation parameters associated with its internal configuration by itself. However, in all operation steps, if the new macro BS identifies neighbor BSs based on only the signals measured by UEs and includes in the neighbor BS list the BSs, measured signals of which satisfy a specific condition, without making a list of initial neighbor BSs, then the home BS is not considered, resulting in the neighbor BS list being inaccurate.

A conventional macro BS is allocated one Physical resource Cell IDentifier (PCID) within a limited range. The PCID allocated to the macro BS should be set not to be identical to those of BSs included in the list of neighbor BSs of the macro BS. However, if the home BS and the macro BS use the same PCID because a PCID of the macro BS is allocated without considering the home BSs, PCID collision may occur between BSs.

SUMMARY OF THE INVENTION

An aspect of the present invention is to address at least the above-mentioned problems and/or disadvantages and to provide at least the advantages described below. Accordingly, an aspect of the present invention is to provide a method and system for allocating Physical resource Cell IDentifiers (PCIDs) in an overlay environment where macro cells and home cells coexist.

Another aspect of the present invention is to provide a method and system for generating an initial Neighbor Relation Table (NRT) and providing it to a macro Base Station (BS) during initial installation of the macro BS.

Another aspect of the present invention is to provide a method and system for initially installing a macro BS considering characteristics of home cells.

Another aspect of the present invention is to provide a method and system for allocating to a macro BS a PCID being different from those of BSs, included in lists of neighbor BSs, during initial installation of the macro BS.

In accordance with an aspect of the present invention, a method for operating cells in a network where macro cells and home cells coexist is provided. The method includes determining a first set of neighbor macro BSs located within a predefined reference distance from a new macro BS to be newly installed, determining a second set of neighbor macro BSs having a cell region overlapping a region of a serving cell served by the new macro BS, detecting at least one sector including a contact with a cell region of the new macro BS within a cell region of each of the neighbor macro BSs in the second set, and determining a neighbor cell set including the detected at least one sector, generating an initial NRT by mapping information about each of neighbor cells included in the neighbor cell set, IDentifiers (IDs) of neighbor macro BSs serving the neighbor cells, and a PCID allocated to each of the neighbor macro BSs, and providing the initial NRT to the new macro BS as neighbor BS information.

In accordance with another aspect of the present invention, a method for operating cells in a network where macro cells and home cells coexist is provided. The method includes generating a macro PCID black list including a PCID allocated to each of neighbor macro BSs for a new macro BS to be newly installed, generating a home PCID black list including PCIDs of neighbor home BSs located within a serving cell region of the new macro BS, determining whether there is at least one remaining PCID, except for PCIDs included in the macro PCID black list and the home PCID black list, among allocable PCIDs, and allocating the at least one remaining PCID to the new macro BS in the presence of at least one remaining PCID.

In accordance with further another aspect of the present invention, a system for operating cells in a network where macro cells and home cells coexist is provided. The system includes a home BS management system for receiving information about a new macro BS to be newly installed, from a macro BS management system, and for managing neighbor home BSs located in a region of a serving cell of the new macro BS based on the information about the new macro BS, and the macro BS management system for determining a first set of neighbor macro BSs located within a predefined reference distance from the new macro BS, for determining a second set of neighbor macro BSs having a cell region overlapping the region of the serving cell served by the new macro BS, for detecting at least one sector including a contact with a cell region of the new macro BS within a cell region of each of the neighbor macro BSs in the second set, for determining a neighbor cell set including the detected at least one sector, generates an initial NRT by mapping information about each of neighbor cells included in the neighbor cell set, IDs of neighbor macro BSs serving the neighbor cells, and a PCID allocated to each of the neighbor macro BSs, and for providing the initial NRT to the new macro BS as neighbor BS information.

In accordance with yet another aspect of the present invention, a system for operating cells in a network where macro cells and home cells coexist is provided. The system includes a home BS management system for receiving information about a new macro BS from a macro BS management system, and for managing neighbor home BSs located within a serving cell region of the new macro BS based on the information about the new macro BS, and the macro BS management system for generating a home PCID black list including PCIDs of the neighbor home BSs, for receiving from the home BS management system, for generating a macro PCID black list including a PCID allocated to each of neighbor macro BSs of the new macro BS, for determining whether there is at least one remaining PCID, except for PCIDs included in the macro PCID black list and the home PCID black list, among allocable PCIDs, and for allocating the at least one remaining PCID to the new macro BS in the presence of at least one remaining PCID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
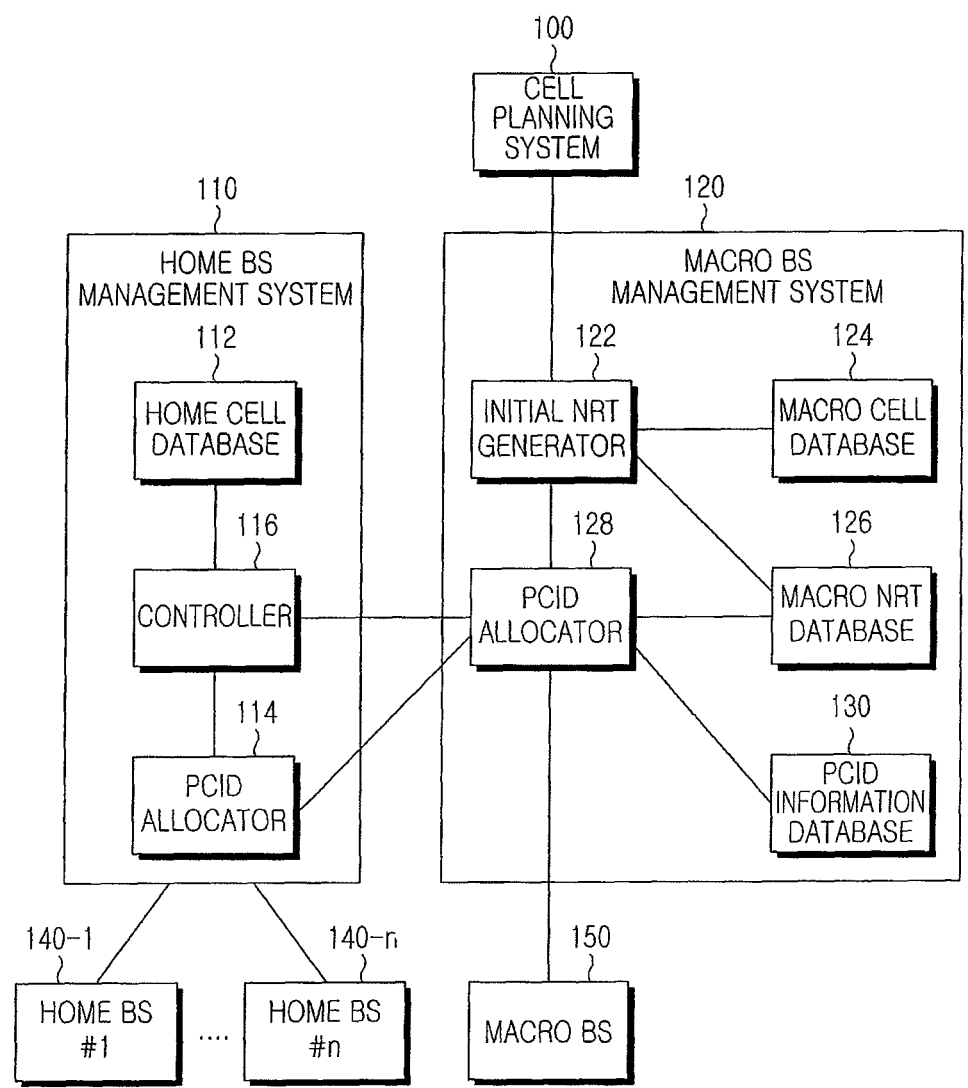
FIG. 1 is a diagram showing a schematic configuration of a network where macro cells and home cells coexist, according to an exemplary embodiment of the present invention.

The following description with reference to the accompanying drawings is provided to assist in a comprehensive understanding of exemplary embodiments of the invention as defined by the claims and their equivalents. It includes various to assist in that overall understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, exemplary embodiments of the present invention may be roughly divided into the generation of an initial Neighbor Relation Table (NRT) and the allocation of a Physical resource Cell IDentifier (PCID) for a new macro Base Station (BS). More specifically, the exemplary embodiments may be roughly divided into three procedures. In a first procedure, in an overlay network where macro cells and home cells coexist, during initial installation of a new macro BS, PCIDs allocated to neighbor BSs located around the new macro BS are acquired, and an initial NRT is generated by mapping IDentifiers (IDs) of the neighbor BSs to their associated PCIDs. In addition, PCIDs included in the initial NRT are used to make a macro cell-based PCID black list (hereinafter referred to as a 'macro PCID black list') $PCID_{BL-macro}$ representing PCIDs unallocable to the new macro BS.

In a second procedure, PCIDs allocated to home cells located in a macro cell served by the new macro BS are used to make a home cell-based PCID black list (hereinafter referred to as a 'home PCID black list') $PCID_{BL-home}$ representing PCIDs unallocable to the new macro BS.

In a third procedure, one of the remaining PCIDs, except for PCIDs included in the $PCID_{BL-macro}$ and the $PCID_{BL-home}$ among all PCIDs, which are limited resources in the network, is allocated as a PCID of the new macro BS. In the absence of the remaining PCIDs, i.e., in the absence of PCIDs not allocated to any BSs, a PCID of a home BS located farthest from the new macro BS among the PCIDs included in the PCID$_{BL\text{-}home}$ is reallocated as a PCID of the new macro BS. A PCID of a home BS using the reallocated PCID may also be reallocated.

Now, the first to third procedures will be described in detail with reference to the accompanying drawings.

FIG. 1 shows a schematic configuration of a network where macro cells and home cells coexist, according to an exemplary embodiment of the present invention. It should be noted that the network configuration shown in FIG. 1 is given as a mere example, and the present invention is not limited to the example shown in FIG. 1.

Referring to FIG. 1, the network includes a cell planning system 110 (or an upper network), a home BS management system 110 for managing a plurality of home BSs, a macro BS management system 120 for managing a plurality of macro BSs, home BSs #1~#n 140-1~140-n, and a macro BS 150. The macro BS 150 represents a new macro BS to be initially installed in the network, and the home BSs #1~#n 140-1~140-n represent home BSs located in a macro cell region served by the macro BS 150, or located in the other regions.

The cell planning system 100 provides the macro BS management system 120 with information for generating an initial NRT of the macro BS 150. The initial NRT stores mapping information between IDs of neighbor BSs and PCIDs allocated to the neighbor BSs. The information for generating the initial NRT includes, for example, latitude/longitude, transmit/receive power, and antenna direction of the macro BS 150.

The macro BS management system 120 includes an initial NRT generator 122, a macro cell database 124, a macro NRT database 126, a PCID allocator 128, and a PCID information database 130.

The initial NRT generator 122 generates an initial NRT of the macro BS 150 through the first procedure. The macro cell database 124 stores information about neighbor macro cells, especially location information such as latitudes and longitudes. The macro NRT database 126 stores PCIDs allocated to the macro cells whose information is stored in the macro cell database 124. Based on the information for generating the initial NRT, the initial NRT generator 122 acquires information about neighbor BSs from the macro cell database 124, acquires PCID information allocated to the acquired neighbor BSs from the macro NRT database 126, and delivers the acquired information to the PCID allocator 128.

The PCID allocator 128 makes a macro PCID black list with PCIDs of macro BSs included in the initial NRT, and stores the macro PCID black list in the PCID information database 130.

The home BS management system 110 includes a home cell database 112, a PCID allocator 114, and a controller 116. The home cell database 112 stores information about the home cells located in a macro cell region served by the macro BS 150. The PCID allocator 114 delivers information about home BSs located in a region of the macro cell served by the macro BS 150, and PCID information allocated to the home BSs, to the PCID allocator 128 through the second procedure.

Then, the PCID allocator 128 makes a home PCID black list with the PCIDs allocated to the home BSs and stores the home PCID black list in the PCID information database 130. Upon recognizing that the macro BS 150 uses the same PCID as that of any one of its home BSs #1~#n 140-1~140-n, the controller 116 controls the PCID allocator 114 to reallocate a PCID of the home BS that uses the same PCID.

1. First Procedure

Now, the first procedure will be described in detail with reference to FIGS. 2 to 4. The first procedure includes detecting neighbor macro BSs of a new macro BS being initially installed, which satisfy a specific condition, and generating an initial NRT in which IDs of the detected neighbor macro BSs are mapped to PCIDs of the detected neighbor macro BSs.

Figure 2:
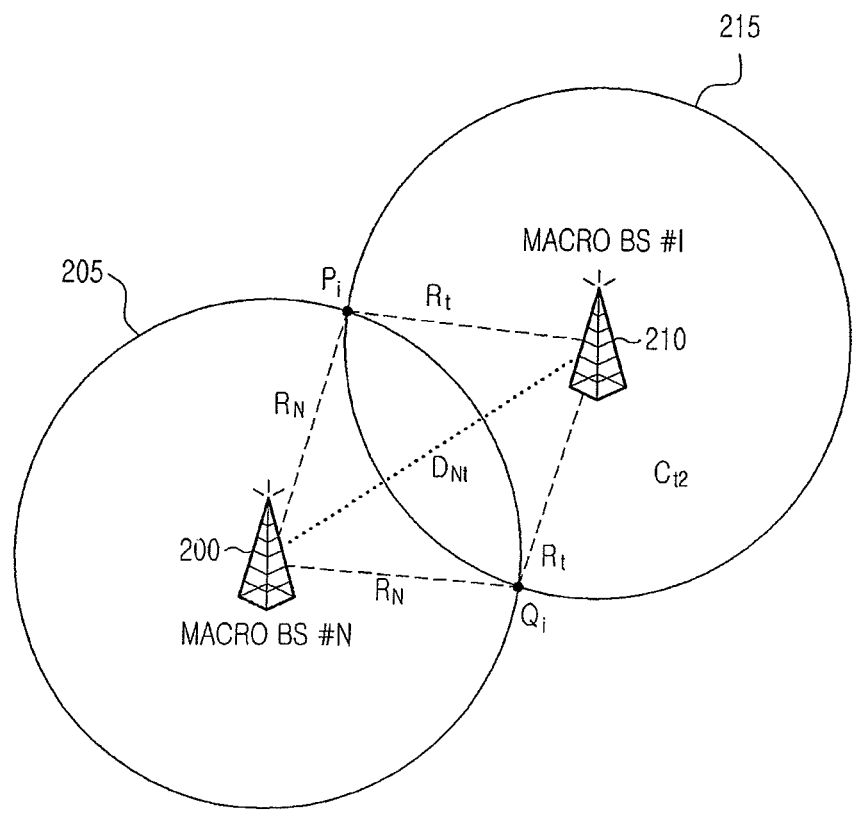
FIG. 2 is a diagram showing how to select reserve neighbor Base Stations (BSs) constituting an initial Neighbor Relation Table (NRT) of an initially installed new macro BS according to an exemplary embodiment of the present invention.

FIG. 2 shows how to select reserve neighbor BSs constituting an initial NRT of an initially installed new macro BS according to an exemplary embodiment of the present invention.

Referring to FIG. 2, a macro BS #N 200 is a new macro BS to be initially installed in a network where macro cells and home cells coexist, and a macro BS #i 210 is one of the neighbor BSs located within a predefined distance from the macro BS #N 200. A macro cell #N 205 represents a service coverage area of the macro BS #N 200, and a macro cell #i 215 represents a service coverage area of the macro BS #i 210. For example, a radius of the service coverage area may be determined based on a power level at which transmission by each BS is possible, or determined by a selection made by a system operator considering the surrounding geographical environment.

A first condition in the first procedure is that a neighbor BS should be located within a predefined reference distance from the macro BS #N 200. A distance between the macro BS #N 200 and the neighbor macro BS may be simply calculated based on location information of each BS, i.e., latitude and longitude. For example, the reference distance may be set to be two or three times the distance between the macro BS #N 200 and its nearest macro BS. It should be noted that the reference distance is herein set to a specific number by way of example only, and is not limited thereto.

The initial NRT generator 122 acquires location information of the macro BS #N 200, i.e., latitude and longitude, received from an upper network, and based thereon, retrieves location information of neighbor macro BSs from the macro cell database 124. Through the retrieval, the initial NRT generator 122 acquires information about reserve neighbor BSs, which are macro BSs located within the predefined distance from the macro BS #N 200. Equation (1) represents the first condition.

$$D_{Ni} < D_N (i \in S_{node})$$ Equation (1)

where $D_N$ denotes the reference distance, $D_{Ni}$ denotes a distance between the macro BS #N 200 and a macro BS #i, i denotes an indicator of a macro BS, and $S_{node}$ denotes a set of all macro BSs.

That is, the macro BS #i 210 is selected as a reserve neighbor BS of the macro BS #N 200, since the macro BS #i 210 is located within the distance $D_N$ from the macro BS #N 200, satisfying Equation (1).

If a set $S_{withinD}$ of reserve neighbor BSs satisfying the first condition is determined, the initial NRT generator 122 retrieves information about neighbor macro BSs satisfying a second condition among the reserve neighbor BSs included in $S_{withinD}$, from the macro cell database 124. More specifically, through the retrieval, the initial NRT generator 122 acquires, from among the reserve neighbor BSs, reserve neighbor BSs satisfying the second condition given to determine whether the neighbor BSs are located in a cell overlapping a region of the macro cell 205 served by the macro BS #N 200 as defined in Equation (2) below. That is, if a sum of a radius of the macro cell #N 205 and a radius of the macro cell #i 215 is greater than a distance between the macro BS #N 200 and the macro BS #i 210, the macro cell #i 215 is considered to be located in a region overlapping the macro cell #N 205.

As shown in FIG. 2, the macro BS #i 210 is located in the macro cell #±215 overlapping the macro cell #N 205 satisfying Equation (2).

$$D_{Ni} < R_N + R_i (i \in S_{overlay})$$ Equation (2)

where $R_N$ denotes a radius of the macro BS #N 200, $R_i$ denotes a radius of the macro BS #i 210, and $S_{overlay}$ denotes a set of reserve neighbor BSs satisfying Equation (2).

If $S_{overlay}$ of reserve neighbor BSs satisfying the second condition is determined, the initial NRT generator 122 retrieves information about sectors satisfying a third condition among sectors of the reserve neighbor BSs included in $S_{overlay}$, from the macro cell database 124. Through the retrieval, the initial NRT generator 122 acquires sectors including contacts $P_i$ and $Q_i$ where the macro cells 205 and 215 overlap.

Figure 3:
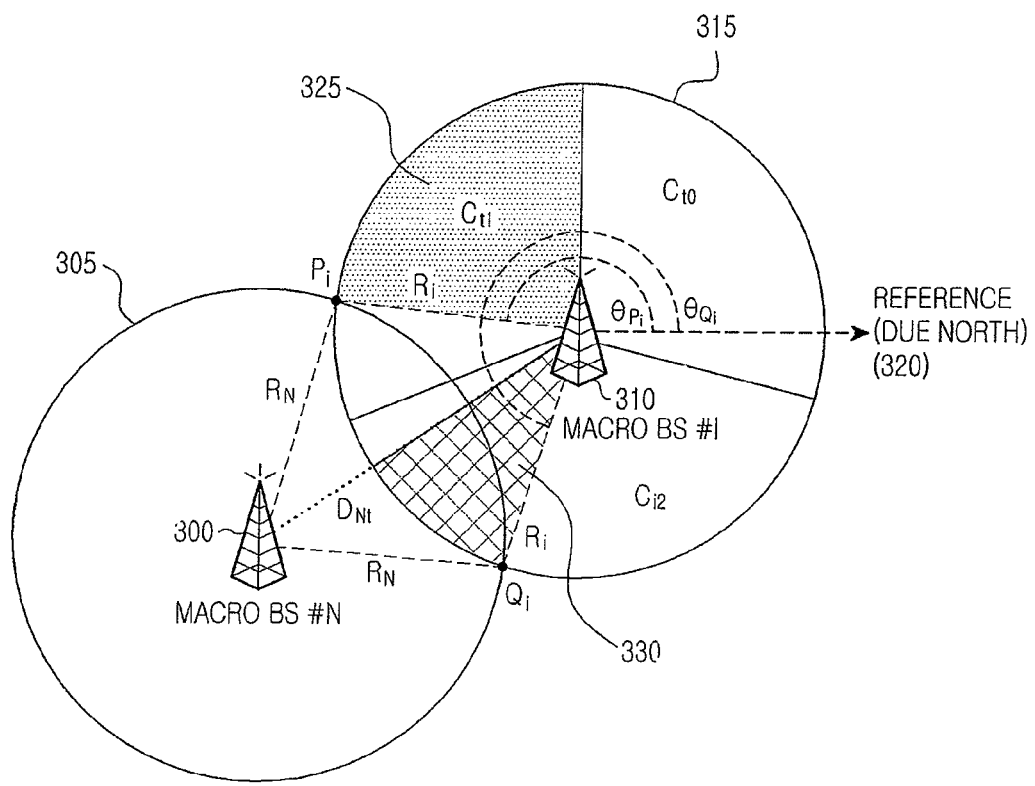
FIG. 3 is a diagram showing how to select reserve neighbor BSs included in an initial NRT using contacts of a region overlapping a macro cell of an initially installed new macro BS according to an exemplary embodiment of the present invention.

FIG. 3 shows how to select reserve neighbor BSs included in an initial NRT using contacts of a region overlapping a macro cell of an initially installed new macro BS according to an exemplary embodiment of the present invention.

Referring to FIG. 3, it is assumed that a macro BS #N 300 is being initially installed in a network where macro cells and home cells coexist, and a macro BS #i 310 is one of reserve neighbor BSs included in a set $S_{overlay}$ for the macro BS #N 300. The macro cell #N 305 represents a service coverage area of the macro BS #N 300, and the macro cell #i 315 represents a service coverage area of the macro BS #i 310. The macro cell #i 315 is divided into three sectors $C_{i0}$, $C_{i1}$, $C_{i2}$.

The initial NRT generator 122 retrieves information about sectors satisfying the third condition among sectors constituting each of the reserve neighbor BSs included in $S_{overlay}$, from the macro cell database 124. The third condition is defined as Equations (3) and (4) using contacts $P_i$ and $Q_i$, respectively, where a region of the macro cell #N 305 and a region of the macro cell #i 315 overlap.

$$\theta_P \subset \theta(C_{i1})$$ Equation (3)

where $\theta(C_{i1})$ denotes an angular degree range for a sector $C_{i1}$ in the region of the macro cell #i 315.

Equation (3) is a condition for selecting a sector based on the contact Pi. More specifically, the initial NRT generator 122 detects an angular degree $\theta_P$ from a reference direction 320 of the macro cell #i 315 to the contact Pi within the region of the macro cell #i 315, and detects a sector #1 325 including the angular degree $\theta_P$ within the region of the macro cell #i 315. The initial NRT generator 122 acquires information about the sector #1 325 from the macro cell database 124. The reference direction 320, a preset reference, may be the due north for example.

The initial NRT generator 122 acquires sectors including the first contact $P_i$ among the sectors constituting each of the reserve neighbor BSs included in $S_{overlay}$, and a set of the acquired sectors is defined as $C_{ip}$.

Next, Equation (4) below is a condition for selecting sectors based on the second contact $Q_i$.

$$\theta_Q \subset \theta(C_{i2})$$ Equation (4)

where $\theta(C_{i2})$ denotes an angular degree range for a sector $C_{i2}$ in the region of the macro cell #i 315. The initial NRT generator 122 detects an angular degree $\theta_Q$ from the reference direction 320 to the contact $Q_i$ within the region of the macro cell #i 315, and detects a sector #2 330 including the angular degree $\theta_Q$ within the region of the macro cell #i 315. In addition, the initial NRT generator 122 acquires information about the sector #2 330 from the macro cell database 124.

The initial NRT generator 122 acquires sectors including the second contact $Q_i$ among the sectors constituting each of the reserve neighbor BSs included in $S_{overlay}$, and a set of the acquired sectors is defined as $C_{iq}$.

After acquiring $C_{ip}$ and $C_{iq}$, the initial NRT generator 122 determines a set of the sectors in the $C_{ip}$ and $C_{iq}$ as a neighbor cell set $C_{neighbor}$ of the macro BS #N 300. That is, the initial NRT generator 122 determines neighbor cells included in the $C_{neighbor}$ as the final neighbor BSs included in the initial NRT, acquires PCID information allocated to the determined neighbor BSs included in the initial NRT, from the macro NRT database 126, and transmits the acquired PCID information to the PCID allocator 128. Then, the PCID allocator 128 generates an initial NRT by mapping IDs of the final neighbor BSs to PCIDs of the final neighbor BSs, and transmits the generated initial NRT to the macro BS 150. In this way, the macro BS 150 may acquire an initial NRT while initially installed in the overlay network.

The PCID allocator 128 generates a macro PCID black list $PCID_{BL-macro}$, a list of PCIDs unallocable to the macro BS 150, using PCIDs included in the initial NRT, and stores the macro PCID black list $PCID_{BL-macro}$ in the PCID information database 130.

2. Second Procedure

Now, the second procedure will be described in detail.

Figure 4:
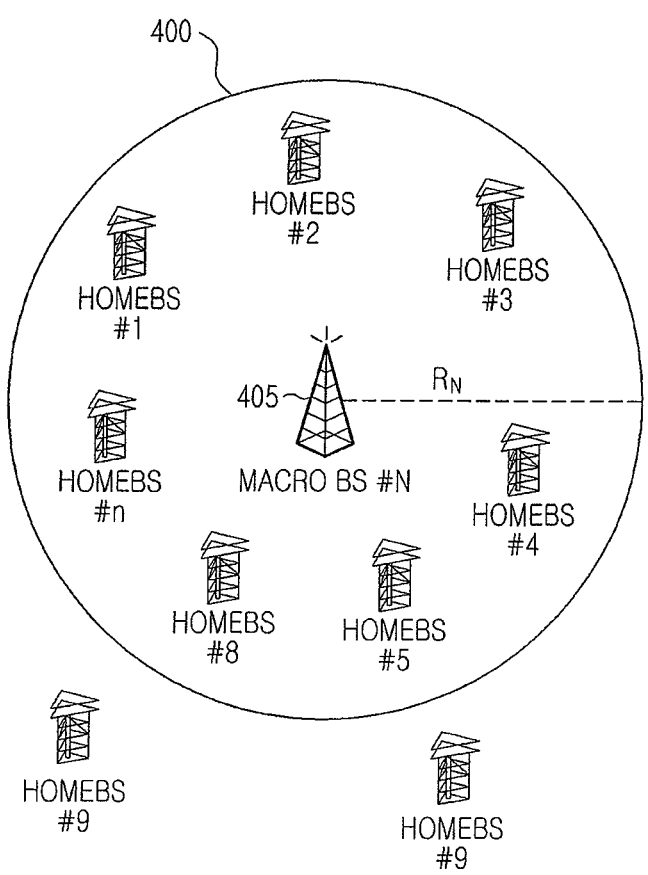
FIG. 4 is a diagram showing home BSs located in a region of a macro cell served by a new macro BS in a network according to an exemplary embodiment of the present invention.

FIG. 4 shows home BSs located in a region of a macro cell served by a new macro BS in a network according to an exemplary embodiment of the present invention.

Referring to FIG. 4, a macro BS #N 405 represents a new macro BS being initially installed in a network where home cells and macro cells coexist, and a macro cell 400 represents a service coverage area of the macro BS #N 405.

The home BS management system 110 receives information about the initially installed macro BS #N 405 from the macro BS management system 120. The information about the macro BS #N 405 includes latitude and longitude information of the macro BS #N 405, transmit power thereof, and a radius of the macro cell served by the macro BS 150.

Based on a transmit power level of the macro BS #N 405, the controller 116 detects a region of the macro cell 400 served by the macro BS #N 405, and detects neighbor home cells, or micro cells located in the region of the macro cell 400. Then, under the control of the controller 116, the PCID allocator 114 acquires information about the detected neighbor home cells from the home cell database 112, and transmits the acquired information to the PCID allocator 128 in the macro BS management system 120. The information about the detected neighbor home cells includes IDs, PCIDs and latitude/longitude information of the home BSs serving the detected home cells.

Thereafter, the PCID allocator 128 generates a home PCID black list $PCID_{BL-home}$ by mapping PCIDs allocated to the neighbor home BSs serving the detected neighbor home cells, to IDs of the neighbor home BSs, and transfers the home PCID black list $PCID_{BL-home}$ to the PCID information database 130.

3. Third Procedure

After acquiring $PCID_{BL-macro}$ and $PCID_{BL-home}$ through the first and second procedures, the PCID allocator 128 allocates a new PCID to the macro BS 150.

For example, let's assume that the total number of PCIDs allocable by the macro BS management system 120 is 504 (#0~#503). The PCID allocator 128 first determines whether the remaining PCIDs (hereinafter referred to as 'new PCIDs'), except for the PCIDs included in $PCID_{BL-macro}$ and $PCID_{BL-home}$, are present in the total of 504 PCIDs. In the presence of at least one new PCID, one of the at least one new PCID is allocated to the macro BS 150.

If all the remaining PCIDs, except for the PCIDs included in $PCID_{BL-macro}$, are used in the neighbor home BSs included in $PCID_{BL-home}$, the PCID allocator 128 sorts the neighbor home BSs included in $PCID_{BL-home}$ in descending order of the distance from the macro BS 150. In addition, the PCID allocator 128 reallocates a PCID of the neighbor home BS located farthest from the macro BS 150 as a PCID of the macro BS 150. Thereafter, the PCID allocator 128 notifies the home BS management system 110 of the information about the neighbor home BS that uses the same PCID as that of the macro BS 150.

When reallocating the PCIDs used by the neighbor home BSs to macro BSs being newly installed, as described above, the PCID allocator 128 transmits to the home BS management system 110 a set $H_{interface}$ of the neighbor BSs that use the same PCIDs as those of the macro BSs. As described above, the PCID allocator 128 reallocates the PCID used by the neighbor home BS located farthest from the newly installed macro BS, since the PCID allocator 128 cannot allocate a new PCID to the new macro BS. However, due to the use of the same PCID, the macro BS and the neighbor home BS using the same PCID may suffer from interference. Accordingly, upon receiving $H_{interface}$, the home BS management system 110 performs an operation of reallocating the PCIDs of the neighbor home BSs, included in $H_{interface}$.

Figure 5:
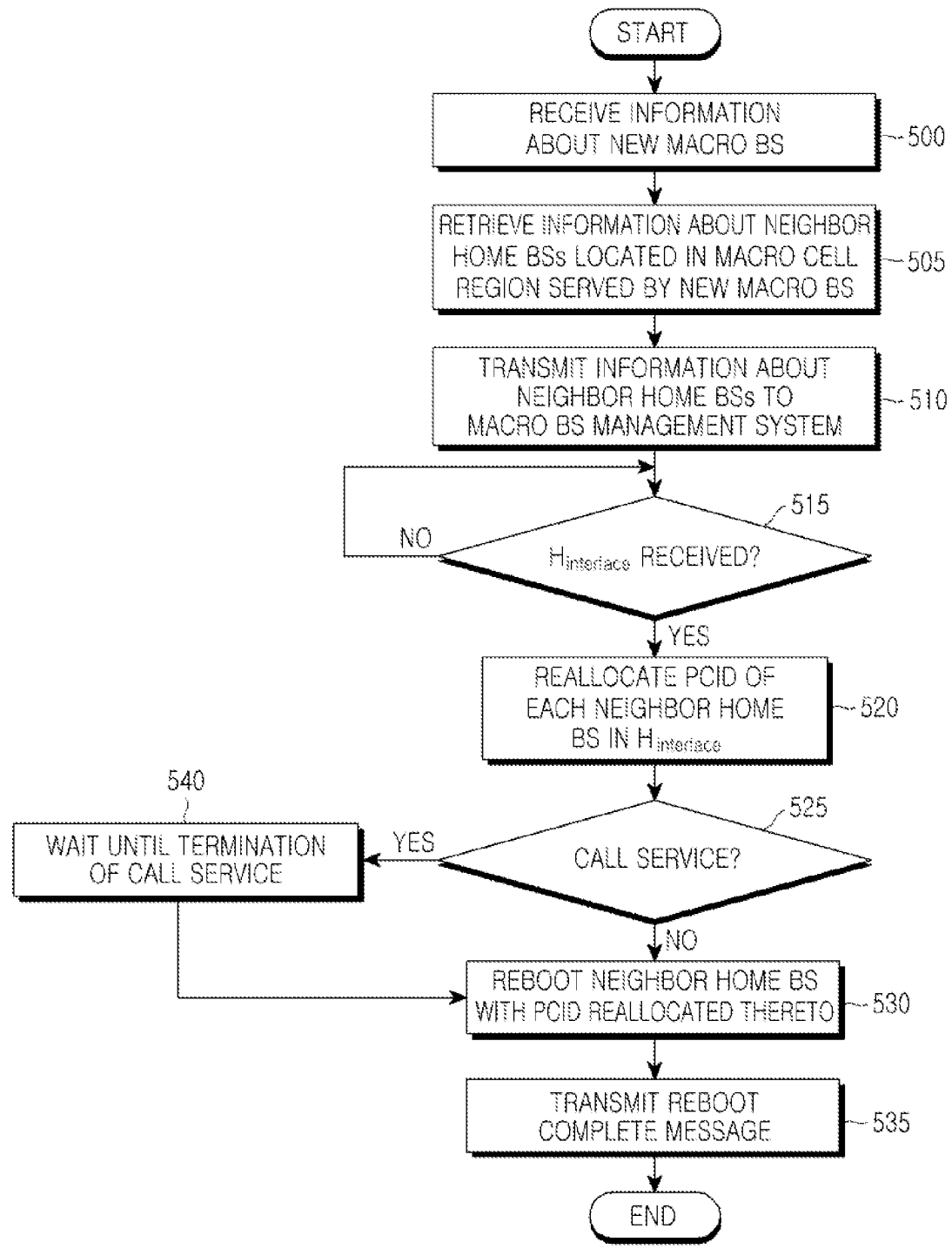
FIG. 5 is a flowchart showing an operation of reallocating a Physical resource Cell IDentifier (PCID) of a home BS according to an exemplary embodiment of the present invention.

FIG. 5 shows an operation of reallocating a PCID of a home BS according to an exemplary embodiment of the present invention.

Referring to FIG. 5, the home BS management system 110 receives information about a new macro BS from the macro BS management system 120 in step 500. The information about the new macro BS includes latitude/longitude, transmit/receive power, and antenna direction of the new macro BS.

In step 505, based on the information about the new macro BS, the home BS management system 110 retrieves information about neighbor home BSs located in a macro cell region served by the new macro BS, from the home cell database 112. In step 510, the home BS management system 110 transmits the retrieved information about the neighbor home BSs to the macro BS management system 120.

In step 515, the home BS management system 110 determines whether a list $H_{interface}$ of the neighbor home BSs using the same PCIDs as that of the new macro BS is received from the macro BS management system 120. If so, the home BS management system 110 reallocates PCIDs of the neighbor home BSs included in $H_{interface}$ as new PCIDs, in step 520. More specifically, the home BS management system 110 reallocates the remaining PCIDs, except for the PCID allocated to the new macro BS, to the neighbor home BSs. The PCID allocation may be performed to minimize possible PCID collisions between the neighbor home BSs and the existing macro BSs. The PCID allocation is outside the scope of the present disclosure and therefore a detailed description thereof will be omitted.

Meanwhile, the PCID allocation to the neighbor home BSs included in each of the macro BSs may be achieved as follows. Generally, the home cell regions are almost the same in size, and determined by the network operator. Therefore, the home BS management system 110 selects and allocates one of the remaining PCIDs, except for the PCID of the macro BS and the PCIDs of the home BSs, that exist in the home cell region of the relevant neighbor home BS. In the absence of the remaining PCIDs, in order to minimize the interference due to the use of the same PCID, the home BS management system 110 sorts the macro BS and the home BSs existing in the home cell region of the neighbor home BS in an order of distance from the neighbor home BS, and allocates a PCID of the farthest home BS to the neighbor home BS.

In step 525, the home BS management system 110 checks whether at least one neighbor home BS, to which a PCID is reallocated, is providing a call service. If so, the home BS management system 110 waits until the call service is terminated in step 540, and proceeds to step 530 after the service is terminated. However, if the neighbor home BS is not providing a call service, the home BS management system 110 reboots the neighbor home BS to reallocate the PCID thereto, in step 530.

After completion of the rebooting of all the neighbor home BSs to which the PCIDs are reallocated, the home BS management system 110 transmits a PCID reallocation complete message to the macro BS management system 120 in step 535.

Thereafter, upon receiving the PCID reallocation complete message, the macro BS management system 120 transmits a message for instructing the new macro BS to start providing a service using the allocated PCID. Upon receiving the message, the new macro BS starts the service. That is, in the case where a PCID of a neighbor home BS is reallocated to a new macro BS, the new macro BS starts providing a service after confirming that a new PCID is reallocated to the neighbor home BS which has used the reallocated PCID, instead of immediately providing the service after being reallocated to the PCID.

Figure 6:
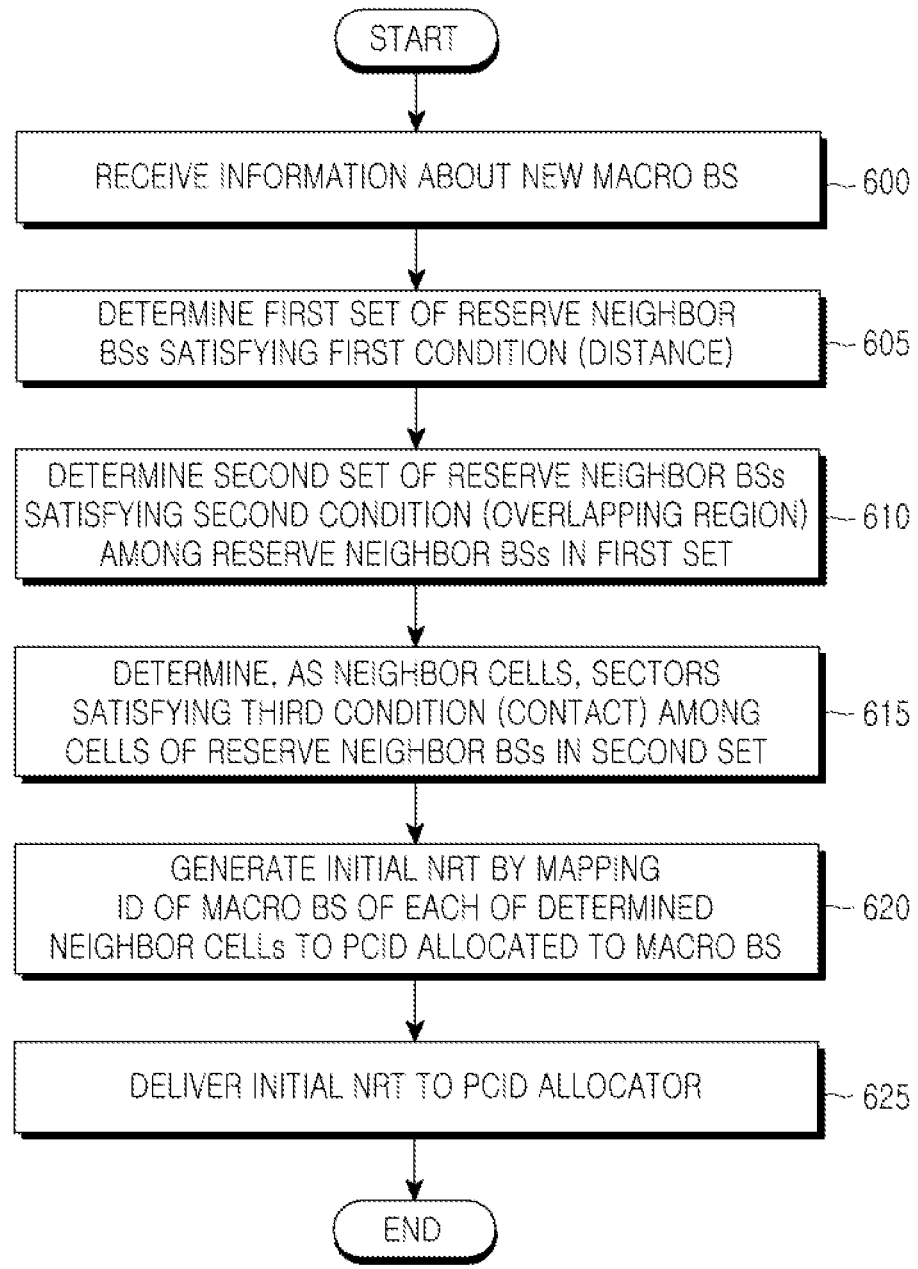
FIG. 6 is a flowchart showing an operation of generating an initial NRT of a new macro BS by a macro BS management system according to an exemplary embodiment of the present invention.

FIG. 6 shows an operation of generating an initial NRT of a new macro BS by a macro BS management system according to an exemplary embodiment of the present invention.

Referring to FIG. 6, the initial NRT generator 122 in the macro BS management system 120 receives information about a new macro BS in step 600. In step 605, the initial NRT generator 122 determines a first condition or a first set consisting of reserve neighbor BSs located within a predefined reference distance from the new macro BS. The reference distance may be determined to be two or three times the distance between the new macro BS and the new macro BS's nearest macro BS. In step 610, the initial NRT generator 122 determines a second condition or a second set consisting of reserve neighbor BSs located in a region overlapping a region of a cell served by the new macro BS among the reserve neighbor BSs included in the first set. In step 615, the initial NRT generator 122 determines a third condition or determines, as neighbor cells, the sectors satisfying Equation (3) or Equation (4) using contacts with the cell served by the new macro BS, among the cells of the reserve neighbor BSs included in the second set. The initial NRT generator 122 generates an initial NRT by mapping IDs of macro BSs located in the determined neighbor cells to PCIDs allocated to the macro BSs in step 620, and transfers the initial NRT to the PCID allocator 128 in step 625. Then, the PCID allocator 128 generates a macro PCID black list including the PCIDs allocated to the macro BSs included in the initial NRT, and transmits the macro PCID black list to the new macro BS 150.

Figure 7:
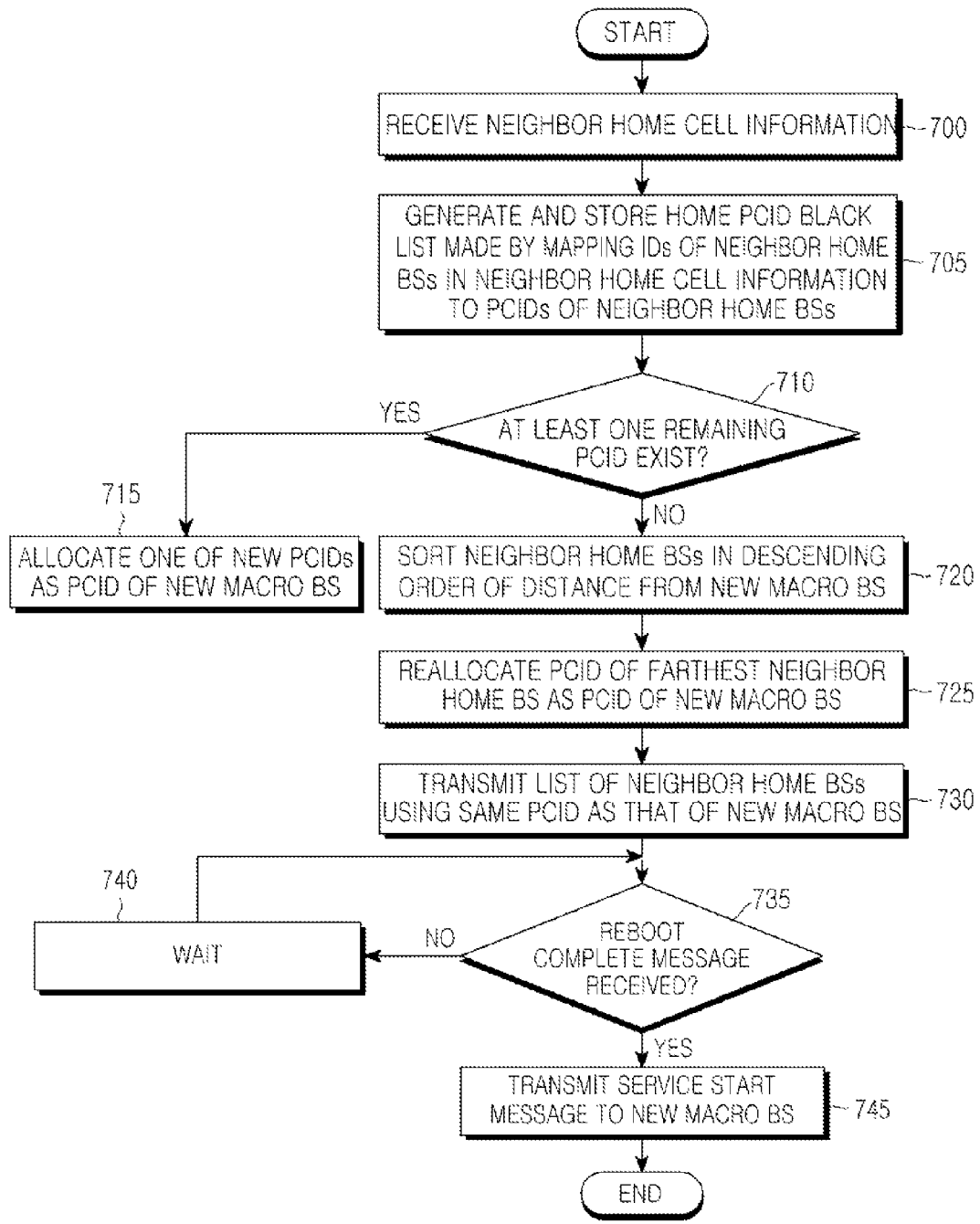
FIG. 7 is a flowchart showing an operation of allocating a PCID to a new macro BS by a macro BS management system according to an exemplary embodiment of the present invention.

FIG. 7 shows an operation of allocating a PCID to a new macro BS by a macro BS management system according to an exemplary embodiment of the present invention.

Referring to FIG. 7, the PCID allocator 128 in the macro BS management system 120 receives neighbor home cell information from the home BS management system 110 in step 700. The neighbor home cell information includes IDs of neighbor home BSs located in a region of a macro cell served by a new macro BS, and PCIDs allocated to the neighbor home BSs. In step 705, the PCID allocator 128 generates and stores a home PCID black list including PCIDs of the neighbor home BSs included in the neighbor home cell information.

In step 710, the PCID allocator 128 determines whether there is at least one or more remaining PCIDs or new PCIDs, except for the PCIDs included in the macro PCID black list and the home PCID black list. In the presence of a new PCID(s), the PCID allocator 128 allocates one of the at least one new PCIDs to the new macro BS in step 715.

In the absence of the new PCID, the PCID allocator 128 sorts the neighbor home BSs in descending order of distance from the new macro BS in step 720. In step 725, the PCID allocator 128 reallocates a PCID of the neighbor home BS farthest from the new macro BS, to the new macro BS.

In step 730, the PCID allocator 128 transmits to the home BS management system 110 a list of at least one neighbor home BS that uses the same PCID as that of the new macro BS.

In step 735, the PCID allocator 128 checks whether a reboot complete message, indicating that each of the neighbor home BSs has completed its rebooting after being reallocated a new PCID, has been received from the home BS management system 110. If the reboot complete message has not been received, the PCID allocator 128 waits for the reboot complete message in step 740.

However, upon receipt of the reboot complete message, the PCID allocator 128 transmits a service start message instructing the new macro BS to start the service in step 745. In this way, in the overlay network where macro cells and home cells coexist, a new macro BS is initially installed considering home cell information, thereby enabling its PCID to be allocated without collision between BSs.

As is apparent from the foregoing description, in an overlay network where macro cells and home cells coexist, during initial installation of a new macro BS, an initial NRT is generated by mapping IDs of neighbor BSs of the new macro BS to PCIDs of the neighbor BSs, and transmitted to the new macro BS, thereby minimizing interference between macro and/or home BSs during PCID allocation and making it possible to provide high-quality service and reduce operating costs of the network operator.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating cells in a network where macro cells and home cells coexist, the method comprising:
    determining a first set of neighbor macro Base Stations (BSs) located within a predefined reference distance from a new macro BS to be newly installed;
    determining a second set of neighbor macro BSs having a cell region overlapping a region of a serving cell served by the new macro BS;
    detecting at least one sector including a contact with a cell region of the new macro BS within a cell region of each of the neighbor macro BSs in the second set, and determining a neighbor cell set including the detected at least one sector;
    generating an initial Neighbor Relation Table (NRT) by mapping information about each of neighbor cells included in the neighbor cell set, IDentifiers (IDs) of neighbor macro BSs serving the neighbor cells, and a Physical Resource Cell IDentifier (PCID) allocated to each of the neighbor macro BSs; and
    providing the initial NRT to the new macro BS as neighbor BS information.

2. The method of claim 1, wherein the reference distance is determined based on a distance between the new macro BS and a BS located nearest to the new macro BS.

3. A method for operating cells in a network where macro cells and home cells coexist, the method comprising:
    generating a macro Physical Resource Cell IDentifier (PCID) black list including a PCID allocated to each of neighbor macro Base Stations (BSs) for a new macro BS to be newly installed;
    generating a home PCID black list including PCIDs of neighbor home BSs located within a serving cell region of the new macro BS;
    determining whether there is at least one remaining PCID, except for PCIDs included in the macro PCID black list and the home PCID black list, among allocable PCIDs; and
    allocating the at least one remaining PCID to the new macro BS in the presence of at least one remaining PCID.

4. The method of claim 3, further comprising:
    in the absence of at least one remaining PCID, sorting the neighbor home BSs in descending order of distance from the new macro BS; and
    reallocating a PCID of a neighbor home BS farthest from the new macro BS as a PCID of the new macro BS.

5. The method of claim 3, further comprising:
    reallocating a new PCID to a neighbor home BS having the relocated PCID; and
    rebooting at least one home BS providing a call service, if the call service is terminated.

6. The method of claim 5, further comprising transmitting a service start message to the new macro BS if the rebooting is completed.

7. A system for operating cells in a network where macro cells and home cells coexist, the system comprising:
    a home Base Station (BS) management system for receiving information about a new macro BS to be newly installed, from a macro BS management system, and for managing neighbor home BSs located in a region of a serving cell of the new macro BS based on the information about the new macro BS; and
    the macro BS management system for determining a first set of neighbor macro BSs located within a predefined reference distance from the new macro BS, determining a second set of neighbor macro BSs having a cell region overlapping the region of the serving cell served by the new macro BS, for detecting at least one sector including a contact with a cell region of the new macro BS within a cell region of each of the neighbor macro BSs in the second set, for determining a neighbor cell set including the detected at least one sector, for generating an initial Neighbor Relation Table (NRT) by mapping information about each of neighbor cells included in the neighbor cell set, IDentifiers (IDs) of neighbor macro BSs serving the neighbor cells, and a Physical Resource Cell IDentifier (PCID) allocated to each of the neighbor macro BSs, and for providing the initial NRT to the new macro BS as neighbor BS information.

8. The system of claim 7, wherein the reference distance is determined based on a distance between the new macro BS and a BS located nearest to the new macro BS.

9. A system for operating cells in a network where macro cells and home cells coexist, the system comprising:
- a home Base Station (BS) management system for receiving information about a new macro BS from a macro BS management system, and for managing neighbor home BSs located within a serving cell region of the new macro BS based on the information about the new macro BS; and
- the macro BS management system for generating a home Physical Resource Cell IDentifier (PCID) black list including PCIDs of the neighbor home BSs, received from the home BS management system, for generating a macro PCID black list including a PCID allocated to each of neighbor macro BSs of the new macro BS, for determining whether there is at least one remaining PCID, except for PCIDs included in the macro PCID black list and the home PCID black list, among allocable PCIDs, and for allocating the at least one remaining PCID to the new macro BS in the presence of at least one remaining PCID.

10. The system of clam 9, wherein in the absence of at least one remaining PCID, the macro BS management system sorts the neighbor home BSs in descending order of distance from the new macro BS, and reallocates a PCID of a neighbor home BS farthest from the new macro BS as a PCID of the new macro BS.

11. The system of claim 9, wherein upon receiving an IDentifier (ID) of a home BS, to which the same PCID as that of the new macro BS is allocated, from the macro BS management system, the home BS management system reallocates a PCID of a home BS, to which the same PCID as that of the new macro BS is allocated, as a new PCID, checks whether a home BS being allocated the same PCID as that of the new macro BS, is providing a call service, reboots the home BS providing the call service upon termination of the call service, and transmits a reboot complete message to the macro BS management system if the rebooting is completed.

12. The system of claim 11, wherein upon receiving the reboot complete message, the macro BS management system transmits a service start message to the new macro BS.

* * * * *